(12) United States Patent
Costa et al.

(10) Patent No.: US 8,822,750 B2
(45) Date of Patent: Sep. 2, 2014

(54) METHOD FOR THE CONDITIONING OF WASTE COMING FROM DECOMMISSIONING OF NUCLEAR PLANTS

(75) Inventors: Pier Paolo Costa, Sommo (IT); Lorenzo Costa, Sommo (IT)

(73) Assignee: ECIR—Eco Iniziativa e Realizzazioni—S.r.l., Milan (IT)

( * ) Notice: Subject to any disclaimer, the term of this patent is extended or adjusted under 35 U.S.C. 154(b) by 0 days.

(21) Appl. No.: 13/884,338

(22) PCT Filed: Nov. 11, 2011

(86) PCT No.: PCT/EP2011/069930
§ 371 (c)(1),
(2), (4) Date: May 9, 2013

(87) PCT Pub. No.: WO2012/062903
PCT Pub. Date: May 18, 2012

(65) Prior Publication Data
US 2013/0225899 A1    Aug. 29, 2013

(30) Foreign Application Priority Data

Nov. 12, 2010   (IT) .......................... MI2010A002105

(51) Int. Cl.
| G21F 9/20 | (2006.01) |
| G21F 9/00 | (2006.01) |
| G21F 9/08 | (2006.01) |
| G21F 9/28 | (2006.01) |
| C03C 1/00 | (2006.01) |
| G21F 9/30 | (2006.01) |

(52) U.S. Cl.
CPC ........ *G21F 9/08* (2013.01); *G21F 9/004* (2013.01); *G21F 9/28* (2013.01); *C03C 1/002* (2013.01); *G21F 9/30* (2013.01)
USPC .............................. 588/20; 588/318; 588/412

(58) Field of Classification Search
USPC ..................................... 502/38, 33, 514, 518
See application file for complete search history.

(56) References Cited

U.S. PATENT DOCUMENTS

| 4,193,853 A | 3/1980 | Childs et al. |
| 5,750,824 A | 5/1998 | Day |
| 5,840,638 A | 11/1998 | Cao et al. |
| 2006/0217584 A1 | 9/2006 | Nunez et al. |
| 2008/0108495 A1 | 5/2008 | Tang et al. |

FOREIGN PATENT DOCUMENTS

GB    2371542    7/2002

OTHER PUBLICATIONS

Verna, E.Y., "Glass Packages Guaranteed for Millions of Years", Storage and/or Disposal, CLEFS CEA, No. 46, 2002, pp. 81-84.

*Primary Examiner* — Edward Johnson
(74) *Attorney, Agent, or Firm* — Fish & Tsang LLP

(57) ABSTRACT

A method is described for the treatment of ferrous nuclear waste, produced in operations of pickling of contaminated metallic surfaces, which makes it possible to minimize the volumes of liquid phases to be treated and to recycle the by-products thereof to the process.

13 Claims, 1 Drawing Sheet

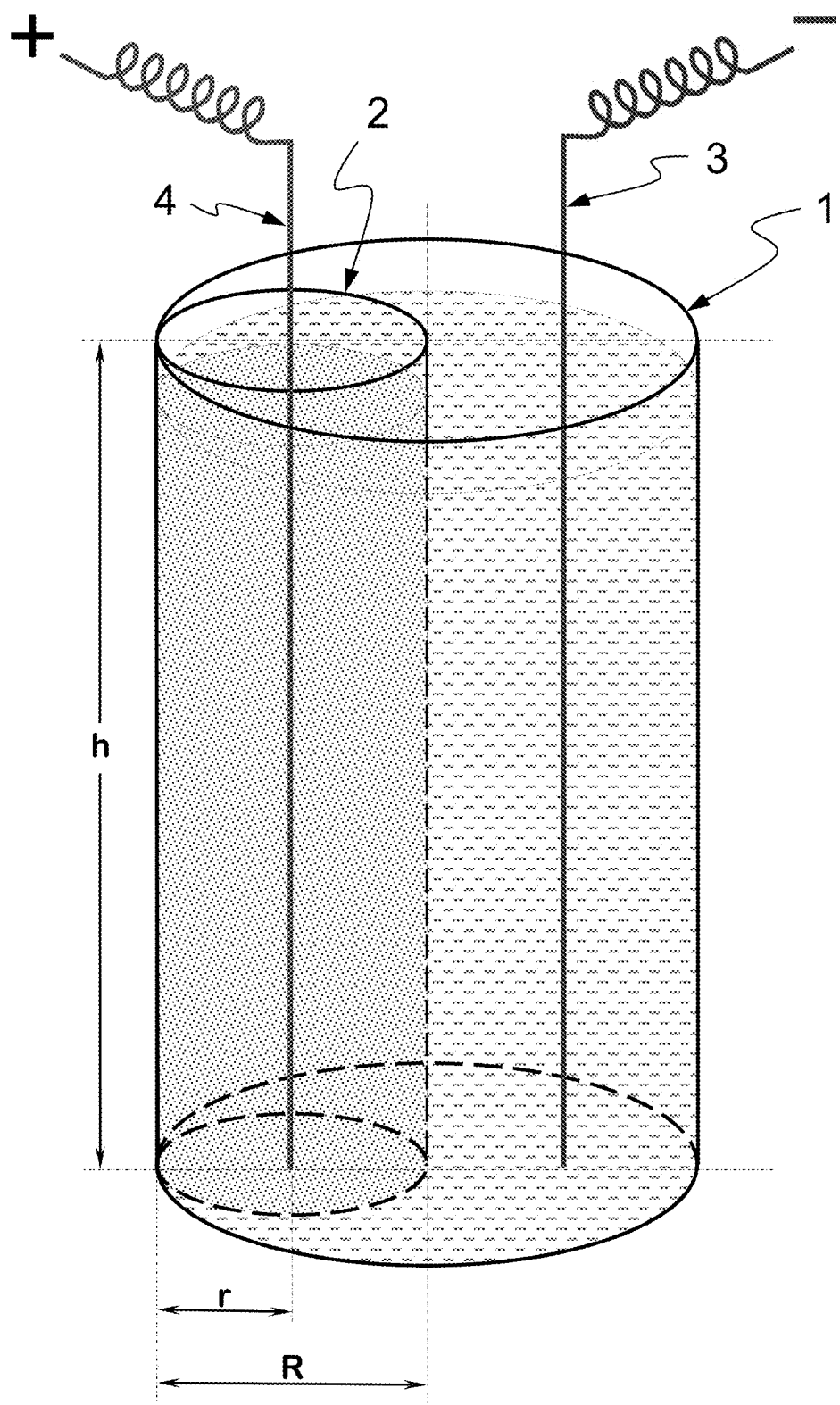

METHOD FOR THE CONDITIONING OF WASTE COMING FROM DECOMMISSIONING OF NUCLEAR PLANTS

This application claims the benefit of priority to PCT Application No. PCT/EP2011/069930, filed Nov. 11, 2011, which claims priority to Italian Patent Application No. MI2010 A 002105, filed on Nov. 12, 2010. This and all other extrinsic materials discussed herein are incorporated by reference in their entirety.

FIELD OF THE INVENTION

The present invention relates to a method for the treatment of ferrous nuclear waste, typically waste produced in operations of pickling of contaminated metallic surfaces.

BACKGROUND OF THE INVENTION

All non-reusable radioactive by-products or residues of processes, or more generally of operations, in which radioactive substances have been generated or used, are identified as "nuclear waste". Owing to its hazardousness for humans and the environment, nuclear waste of any type and origin must be treated and stored according to quite particular methodologies, which ensure that the radiation and nuclear elements or isotopes are confined even for very long periods of time.

There are numerous types of processes in which nuclear elements or radiation are used, which produce waste at various levels of concentration and hazardousness. A proposed classification, in use in Italy, divides these wastes into:

- category 1, which comprises all waste with a low level of radioactivity; it is the largest category, comprising, by weight, approx. 90% of the waste produced, but only 1% of the radioactivity (examples are medical material used in nuclear medicine, disposable clothing supplied during a visit to a nuclear plant etc.);
- category 2, which comprises all waste with a medium level of radioactivity; this requires shielding, but only constitutes 7% of the wastes, with a total radioactivity of 4% (examples are the sheaths of the fuel elements of a reactor);
- category 3, which comprises all wastes with a high level of radioactivity, constituting only 3% of the wastes but representing 95% of the radioactivity; they are the most dangerous owing to the high radiation dose that accidental exposure would involve and owing to the decay of the order of millions of years for some of the radioactive isotopes that they contain.

The different types of waste require different disposal procedures. Numerous techniques for this purpose have been investigated and described in the last 60 years. The results are in the public domain and in general are easily accessible; for the specific methods relating to the long-term storage of types of waste containing long-lived and/or highly mobile isotopes, the conclusions are, however, still uncertain. The resources invested in these studies are, presumably, enormous; those to be invested for the conditioning and long-term storage of existing nuclear waste (including reclamation of the associated sites), are known in part: for the USA alone they have been evaluated at hundreds of billions of dollars.

The disposal of these wastes generally requires a phase of conditioning, which consists in transforming the waste to a form suitable for storage; and storage of the conditioned waste at suitable sites, either natural or produced industrially.

A particular type of nuclear waste, strategically very important, is that generated in the operations for reclamation of nuclear reactors that are no longer active and of nuclear sites that have become obsolete. In this case the nuclear wastes are typically generated in the operations of recovery and decontamination of large metal structures, which, exposed to contact and/or to the radiation of radioactive isotopes, have in their turn become radioactive (limited to the exposed surface), by chemical contamination or by nuclear mutation (under the action of radiation). The complex of operations associated with these reclamation operations is called "decommissioning" in this field, and this term will be used hereinafter. The dominant technique in the operations of decontamination of metallic surfaces is called "pickling".

Many of the wastes from decommissioning thus generated belong to the aforementioned category 3, and typically contain isotopes with long average life and of high mobility, which always require the specific conditioning for highly hazardous waste. While processes that are industrially approved and economically viable have been identified for the complete management of nuclear waste belonging to categories 1 and 2, for those of category 3 the results obtained are important but still partial, especially for the uneconomic aspect of the conditioning required, and to date there is no operational depository for long-term storage.

With regard to the conditioning of the decommissioning waste, and typically that generated by pickling, the experts have come to the conclusion that it is necessary to use vitreous matrices with high stability, both chemical and thermo-mechanical, for all long-lived and/or highly mobile radioactive isotopes; see for example the article "*Glass packages guaranteed for millions of years*", by É.Y. Vernaz, Clefs CEA, No. 46 (2002), p. 81-84. Numerous examples of vitrification of category 3 waste, including at industrial level, have been proposed, but they were beset by problems of process reliability and typically high costs.

Recently, among the most promising vitreous materials for the purpose of retaining radioactive isotopes, especially if in the presence of sulphates, chromates, phosphates and halides, phosphate vitreous systems containing iron have been accredited. Systems of this type are described in U.S. Pat. No. 5,750,824 and U.S. Pat. No. 5,840,638 and in patent application GB 2,371,542 A.

Among these, U.S. Pat. No. 5,750,824 is particularly interesting, and teaches the production of phosphate glasses containing from 30 to 70 wt. % of phosphorus oxide (as $P_2O_5$) and from 22 to 50% of iron oxide, the rest consisting of oxides of other metals, including those derived from nuclear waste; moreover, this document teaches that the best results are obtained with glasses in which iron is present to at least 50%, preferably at least 80% and more preferably at least 90%, in oxidation state 3, i.e. as $Fe^{3+}$ ion. According to this document, phosphate glasses with a high $Fe^{3+}/Fe^{2+}$ ratio are characterized by the best properties of chemical resistance (for example, to leaching, i.e. washing away with water), of density and of thermomechanical resistance.

The methods taught in these documents envisage the preparation of a mixture of powders of oxides or salts of phosphorus and of iron in the desired weight ratios; melting of this mixture; addition, before or during said melting, of the waste to be disposed of; and solidification of the melt in suitable moulds.

A problem that is still open with these methods is management of the huge volumes of liquid of the solutions in which the decommissioning waste is initially dissolved. In fact, in some cases the solutions are added directly to the melt of oxides or salts of phosphorus and iron, generating however enormous volumes of vapours that must then be condensed, decontaminated and disposed of; in other cases, the solutions are first dried, and the waste is added in the form of powder to the melt, but again in this case obtaining the powders of waste involves evaporation of large amounts of liquid.

SUMMARY OF THE INVENTION

The aim of the present invention is to provide an improved method for the conditioning of decommissioning waste, specifically the waste from pickling.

According to the invention, this aim is achieved with a process that comprises the following steps:
- dissolution of the contaminated metallic surfaces of nuclear plants by using phosphoric acid, obtaining a solution with pH below 1.5;
- oxidation of the iron ions in solution from $Fe^{2+}$ to $Fe^{3+}$, so as to obtain an $Fe^{3+}/Fe^{2+}$ ratio equal to or greater than 9;
- raising the pH of the resultant solution to a value higher than 1.5 and lower than 10, causing the precipitation of phosphate salts of iron and of the metal ions present in the solution;
- separation of the precipitated salts from the liquid phase; and
- thermal treatment of vitrification of the mixture of precipitated solids.

The method of the invention offers various advantages relative to the known ones. In particular, it does not require the pretreatment of enormous volumes of solution for recovering the salts of the radioactive metals that are then to be added to the precursors of the iron-phosphate glass in suitable proportions, because with the present process the mixture of phosphorus and metals, roughly in the necessary proportions, is produced in situ in the solution, and is then obtained from this and is sent to the thermal treatments, while the liquid phase that remains can be recycled, after topping up with fresh concentrated phosphoric acid, in a subsequent cycle of dissolution (pickling), precipitation and separation, without having to be disposed of separately. In this way all the treatments that can generate secondary contamination are avoided.

BRIEF DESCRIPTION OF THE DRAWINGS

FIG. 1 shows an electrochemical system for carrying out one embodiment of the method of the invention.

DETAILED DESCRIPTION OF THE INVENTION

The first operation of the process consists of washing and dissolution in phosphoric acid of the surface-contaminated metallic parts (pickling), obtained from the dismantling of the nuclear plant. These are conveniently reduced to pieces of suitable dimensions and weight, for example of the order of kilograms or tens of kilograms. The metallic parts derived from nuclear plants are typically made of steel, and so consist mainly of iron, with minor amounts of elements typical of steel metallurgy (chromium, nickel, manganese, etc.) and of radioactive elements that have been deposited on the surface, or have been produced by contact with radioactive isotopes or radiation. It has been observed that the appropriate concentration by weight of metals in the acid solution is between approx. 5 and 12%, preferably about 10%, of the weight of the total solution. This solution is then standardized to the desired concentration and pH (for example 9 wt. % and pH 1). Working under these conditions in phosphoric acid, a concentrated solution is obtained, ideal for the subsequent operations of oxidation of iron from $Fe^{2+}$ to $Fe^{3+}$ and sufficiently close to the saturation point for the precipitation of iron-phosphate salts. The resulting solution has a weight ratio of phosphorus to iron suitable for the production of iron-phosphate glasses having the necessary characteristics for the purposes of conditioning of the radioactive metals initially present in solution. After separation of the solid precipitate from the liquid phase of the solution, there is a final inspection of the elemental composition of the material obtained and, if necessary, adjustment of the composition optionally with addition of the deficient component. For the purposes of the invention, the solution must contain iron and phosphorus in a molar ratio between 33/66 and 45/55, and preferably of about 40/60, and must have a pH below 1.5.

The solution obtained can optionally be analysed to determine its chemical composition, and in particular the molar ratio Fe/P and the $Fe^{3+}/Fe^{2+}$ ratio.

For the purposes of the invention, it is preferable for the molar ratio Fe/P to be around 40/60; this ratio can be adjusted to around the optimum value by addition, to the solution obtained directly from pickling, of a soluble iron salt or of phosphoric acid, depending on which of the two components was shown by the analysis to be deficient relative to said optimum ratio.

Moreover, it is preferable for the $Fe^{3+}/Fe^{2+}$ ratio to have a high value, higher than 9 and typically higher than 24. After dissolution of said metallic parts, iron is present in solution almost completely in form of $Fe^{3+}$ ions. Said ratio can be brought into the preferred range by oxidation of the original solution by any known method, for example by addition of hydrogen peroxide, of permanganate ion, by bubbling of oxygen in the solution, or by any other known method. The obtainment of the condition $Fe^{3+}/Fe^{2+}>9$ (or of the preferred condition $Fe^{3+}/Fe^{2+}\geq24$) can be checked with a chemical analysis, by titrating the concentration of $Fe^{2+}$ (for instance with $KMnO_4$, as known in the field) before and after the oxidation step, and then comparing the two measures; the second measure is representative of the concentration of $Fe^{2+}$ after the oxidation step, while the first one is representative of the sum of concentrations of $Fe^{2+}$ and $Fe^{3+}$ ions in the solution after the oxidation step (from which the concentration of $Fe^{3+}$ can be obtained by simple difference). In practice, it may be convenient to operate by quickly estimating of the amount of oxidizing agent required; this may be done assuming that all the weight of the starting metallic part is represented by iron, obtaining the number of moles of iron based on this approximation, and use an amount of oxidizing agent in excess than 0.9 the estimated moles of iron (or in excess of 0.96 said estimated moles, in case the preferred condition $Fe^{3+}/Fe^{2+} \geq 24$ is desired).

The third operation of the process of the invention consists of causing the precipitation of the metal salts present in solution, by raising the pH of the latter without increasing its volume. In this operation the solution pH is brought to a value between 1.5 and 10, and preferably between 1.7 and 2.5.

This condition can be obtained by adding a suitable solid base, for example $Ca(OH)_2$, to the solution; the amount of hydroxide to be added can be predetermined knowing the volume and the initial pH of the solution and given the value of pH that is to be obtained, for example equal to 2 (at these values of pH, the hydrolysis of the $Ca^{2+}$ ion can be neglected for the purposes of the calculation), or by monitoring with a pH-meter the pH of the solution, kept stirred, during gradual addition of the hydroxide. During precipitation of the phosphates of iron and of the other metals initially present in solution, calcium phosphate, $Ca_3(PO_4)_2$, which is highly insoluble, precipitates as well; this does not, however, pose a problem, but rather is an extra advantage of the method, because this salt vitrifies well together with the iron-phosphate glass, without adversely affecting its good characteristics mentioned above and, which is very important, as it does not remain in solution, it does not contaminate the supernatant, which must remain suitable for recycling. The inventors observed that, typically, a calcium-iron phosphate glass obtained by precipitation of the salts from the initial solution when the pH is brought to a value equal to about 2 has a P/Ca molar ratio equal to about 11.5; glasses of this type have proved suitable for the purposes of the invention.

Preferably, raising of the pH is obtained electrochemically.

A possible way of achieving this condition is to treat the solution obtained from pickling in a half-cell of an electrochemical cell. More specifically, this method generally consists of:

providing an electrochemical cell separated into two half-cells by means of a suitable separator;

the solution to be treated is introduced into a first half-cell, which during operation of the method will be brought to cathode's potential; a first electrode (cathode) is inserted in the solution;

a solution of composition similar to that of the solution to be treated, but not containing the metal ions to be precipitated, is introduced into the second half-cell, which during operation of the method will be brought to anodic potential; for example, a solution of phosphoric acid of concentration similar to that of the solution to be treated is suitable for this purpose; a second electrode (anode) is introduced into this solution;

the electrodes are then brought to their working potential, causing electrolysis of the water;

the reaction of reduction takes place in the first half-cell:

1. $2H_2O + 2e^- \rightarrow H_2\uparrow + 2OH^-$ 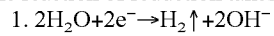

(after dissociation of the two molecules of water into two $H^+$ ions and two $OH^-$ ions); in this reaction, $H^+$ ions are consumed and $OH^-$ ions are formed, with pH raising in the half-cell that contains the solution to be treated;

in parallel, in the second half-cell (again after dissociation of the water) the reaction of oxidation takes place:

1. $2H_2O \rightarrow O_2\uparrow + 4H^+ + 4e^-$ 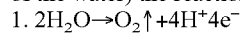

which can be utilized for preparing phosphoric acid at the optimum concentration and at zero cost, for topping up of the recovered liquid, before recycling to pickling.

The reactions exemplified above are only one of the possible redox pairs that can be used for raising the pH in the half-cell that contains the solution to be treated; other reactions can be obtained from tables given in electrochemistry manuals.

The method of electrochemical precipitation is ideal, because it avoids having to add other solutions to that derived from pickling, which would increase the total volume of liquids to be treated and disposed of, after suitable conditioning treatments, at the end of the process. Operating in this way, the component useful for vitrification (the phosphates, principally consisting of ferric phosphate plus traces of other phosphates of the metals originally in solution, or simply of adsorbed metals) is precipitated in the optimum proportion, without compromising the quality of the glass and preserving the starting solution of phosphoric acid for a further pickling cycle, i.e. reusing all the components of the original waste and the process side-products; this route thus constitutes the ideal method for avoiding any secondary contamination.

Once the phosphates have been precipitated from the solution, they can be recovered by removing the supernatant liquid phase, for example by simple decanting. If necessary, the precipitate can then be centrifuged, to obtain better separation from the liquid phase. The mixture of wet phosphates is then preferably mixed mechanically, to homogenize it. In fact, during the pH-raising step, it is possible that the various phosphates precipitate at different times, giving rise to a precipitate in which the different phosphates are stratified according to the order of precipitation. An inhomogeneous wet cake thus obtained might give rise to a glass that is not perfectly homogeneous: although the precipitate is submitted to melting, the viscosity of the melt might be such that it does not permit complete homogenization during melting, with the risk of obtaining a final glass of composition that is not perfectly homogeneous and therefore portions thereof (especially any portions low in iron) may not have the characteristics required for the application.

The precipitate is then vitrified, implementing all the precautions that the presence of radioactivity requires. Typically the precipitate $FePO_4$ melts and vitrifies at a temperature not above 1100° C. The presence of other cations coprecipitated with the iron phosphate can generate a relatively wide temperature range within which vitrification takes place, typically between 800° C. and 1300° C.

The liquid phase, still containing notable amounts of phosphoric acid, and potentially of various metal ions, even traces of radioactive isotopes, is recovered by typical operations known in the art, for example by decanting, and/or centrifugation and can be reused in a subsequent cycle of dissolution of metallic parts and precipitation of phosphates, after topping up the phosphoric acid to replenish the amount consumed in precipitation.

The process of the invention thus obtains the result of disposing of the metallic parts coming from decommissioning avoiding the need to treat large volumes of liquid phases, typical of the processes of the prior art. In fact, with the processes of the prior art, the volumes of liquid phases generated are proportional to the weight of said metallic parts (because for each cycle of treatment of a unit weight of metallic parts it is necessary to use a given volume of solution), whereas in the present invention the volume of liquid phase is essentially that required for a single operation of dissolution of an aliquot of metallic parts.

The invention will be further illustrated by the following example.

Example 1

It is prepared a solution that simulates a typical liquid waste obtained by dissolution of a steel part coming from decommissioning of a nuclear plant. The solution is produced with 1 l of $H_3PO_4$ 2.5 M, dissolving in it 60 g of metallic iron powder (prod. #209309 from Aldrich catalogue, purity 97%), 3 g of metallic nickel powder (Aldrich, prod. #266981, 99%), 4.4 g of cobalt chloride (Aldrich, prod. #232696, 97%) and 0.1 g each of cesium nitrate (Aldrich, prod. #289337, 99%) and antimony acetate (Aldrich, prod. #483265, 99.99%), cesium and antimony representing typical contaminants present in steel coming from nuclear plants.

After dissolution of the powders, it is added 420 ml of a 2.7 M solution of $H_2O_2$ (obtained diluting 1 l of a commercial 30% wt/wt $H_2O_2$ solution in water, to a total of 3.67 l, taking into account that the starting 30% wt/wt solution has a density of about 1.11 kg/l, and the resulting solution, about 9% wt/wt, has a density of about 1.03 kg/l); the resulting solution is then placed in a gas-tight container. Apart is prepared an electrochemical cell, schematically represented in FIG. 1. The cathodic semi-cell, 1, is a cylindrical liquid-tight container made of "Duran" glass open in its upper part, having a radius R of 4 cm and a height h of 20 cm (overall volume about 1000 cm³). The anodic semi-cell, 2, is cylindrical, open in its upper part, has a radius r of 2 cm and an height h of 20 cm (volume about 250 cm³); this semi-cell has a disk-shaped basis (about 1 cm thick) made of polytetrafluoroethylene, while the lateral wall is made of a net of vinyl polymer backing a semipermeable anodic membrane, having the property of allowing passage of anions but not of cations, and with high resistance to acids. The anodic semi-cell is positioned inside the cathodic semi-cell, as shown in the drawing, thus reducing the volume of the cathodic semi-cell to about 750 cm³.

Inside the cathodic semi-cell is inserted a cathode, 3, and in the anodic semi-cell is inserted an anode, 4, both made of titanium coated with a platinum foam with high surface area. The two electrodes are connected to a potentiostat model VersaSTAT 3F of Princeton Applied Research, capable of delivering exact and controlled voltage values in the range 0-20 V and measuring the resulting electric current intensities in the range 0-2 A.

700 ml of solution obtained as described above are introduced in the cathodic semi-cell 1, and 220 ml of a 2.5 M solution of $H_3PO_4$ are introduced in the anodic semi-cell 2, obtaining essentially the same liquid level in the two semi-cells.

An electrical potential difference of 16 V is applied between the electrodes; two distinct aspirator systems are positioned above the cathode and the anode, to remove and keep separate the gaseous emissions released at the electrodes. It is observed a light activity, in the form of small bubbles that form along the cathode first, and then along the anode as well. After a short induction time, the electrical current reaches a steady value of about 1.1 A. These operative conditions are maintained during 24 hours. During this period, a turbidity increasing with time is observed in the cathodic semi-cell, along with precipitation of a solid material in the bottom of this semi-cell.

After 24 hours the power source is turned off, the electrodes are disconnected from the system, the anodic semi-cell is removed, the content of the cathodic semi-cell is separated by centrifugation, obtaining 490 ml of supernatant and 183 g of solid residue, which is dried at 50° C.

At a chemical analysis, the solid results to be mostly composed of iron phosphate, $FePO_4$, plus the phosphate salts of the other metallic elements initially introduced in the system in the form of powders, in weight ratios essentially reproducing the weight ratios to iron in the starting mixture. This mixture of phosphates is ready for immediate vitrification by thermal treatment.

The supernatant separated by centrifugation by the solid product is directly recyclable, after topping with fresh concentrated $H_3PO_4$, to subsequent pickling operations.

The process of the invention makes thus possible to store nuclear waste in a stable solid form, and to re-use the other products in further cycles of the same process, avoiding the formation of relevant amounts of by-products that need be disposed of.

The invention claimed is:

1. Method for the conditioning of waste coming from decommissioning of nuclear plants, comprising the following steps:
   dissolution of the contaminated metallic surfaces of nuclear plants by using phosphoric acid, obtaining a solution with a pH value lower than 1.5;
   oxidation of iron ions in solution from $Fe^{2+}$ to $Fe^{3+}$, so as to obtain a $Fe^{3+}/Fe^{2+}$ ratio equal to or higher than 9;
   raising the pH of the thus obtained solution to a value higher than 1.5 and lower than 10, causing the precipitation of phosphate salts of iron and of the metallic ions present in the solution;
   separation of the precipitated salts from the liquid phase; and
   thermal treatment of vitrification of the mixture of precipitated solids.

2. The method according to claim 1, further comprising the recovery of said liquid phase and its recycle in a subsequent run of steps of the method.

3. The method according to claim 1, in which, in the step of dissolution of the contaminated metallic surfaces, the metal is added in an amount comprised between 5 and 12% by weight of the total weight of metal and phosphoric acid.

4. The method according to claim 1, in which, after said dissolution step, an elemental analysis of the chemical composition of the solution is performed, and, if it is determined that the molar ratio Fe/P is outside the range comprised between 33/66 and 45/55, the component present in too low amount is added to the solution in order to bring the value of said ratio in said range.

5. The method according to claim 1, in which, in said oxidation step, the $Fe^{3+}/Fe^{2+}$ ratio is brought to a value equal to or higher than 24.

6. The method according to claim 1, in which said oxidation step is carried out through addition of hydrogen peroxide or of permanganate ion, or through bubbling of oxygen into the solution.

7. The method according to claim 1, in which, in said pH raising step, said pH is brought to a value comprised between 1.7 and 2.5.

8. The method according to claim 1, in which the pH raising is obtained by addition to the solution of a basic compound in solid form.

9. The method according to claim 8, in which said basic compound is $Ca(OH)_2$.

10. The method according to claim 1, in which the pH raising is obtained through an electrochemical reaction.

11. The method according to claim 10, comprising the following steps:
    providing an electrochemical cell divided into two semi-cells by a suitable separating element;
    introducing into the first semi-cell the solution to be treated and a first electrode;
    introducing into the second semi-cell a solution having composition similar to that of the solution to be treated, but not containing the metallic ions to be precipitated, and a second electrode;
    bringing the first electrode to cathodic potential and the second electrode to anodic potential, causing the following reactions to take place respectively in the first and in the second semi-cell:
    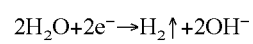
    and
    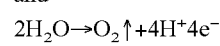
    with production of $OH^-$ ions and consequent pH raising in the first semi-cell, which contains the solution to be treated.

12. The method according to claim 11, in which the $H^+$ ion produced in the reaction of the second semi-cell is used to produce phosphoric acid consumed in the precipitation of metallic phosphates.

13. The method according to claim 1, in which said thermal treatment is carried out at a temperature comprised between 800° C. and 1300° C.

* * * * *